United States Patent
Kesarwani et al.

(10) Patent No.: US 11,475,020 B2
(45) Date of Patent: Oct. 18, 2022

(54) ENCRYPTION SCHEME RECOMMENDATION

(71) Applicant: International Business Machines Corporation, Armonk, NY (US)

(72) Inventors: Manish Kesarwani, Bangalore (IN); Akshar Kaul, Bangalore (IN); Gagandeep Singh, Jalandhar (IN); Sameep Mehta, New Delhi (IN); Hong Min, Poughkeepsie, NY (US); James Willis Pickel, Camarillo, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 804 days.

(21) Appl. No.: 16/433,980

(22) Filed: Jun. 6, 2019

(65) Prior Publication Data

US 2020/0387518 A1    Dec. 10, 2020

(51) Int. Cl.
*G06F 16/2457* (2019.01)
*G06F 16/248* (2019.01)
*G06F 16/22* (2019.01)
*G06F 16/242* (2019.01)
*G06F 21/60* (2013.01)
*G06F 21/62* (2013.01)

(52) U.S. Cl.
CPC .... *G06F 16/24578* (2019.01); *G06F 16/2272* (2019.01); *G06F 16/248* (2019.01); *G06F 16/2423* (2019.01); *G06F 21/602* (2013.01); *G06F 21/6227* (2013.01)

(58) Field of Classification Search
CPC ........... G06F 16/24578; G06F 16/2272; G06F 16/2423; G06F 16/248; G06F 21/602; G06F 21/6227
USPC ........................................................ 713/193
See application file for complete search history.

(56) References Cited

U.S. PATENT DOCUMENTS

| | | | |
|---|---|---|---|
| 11,106,810 B2* | 8/2021 | Natanzon | H04L 9/0894 |
| 11,263,268 B1* | 3/2022 | Bourbie | G06F 16/2228 |
| 2011/0283113 A1* | 11/2011 | Moffat | G06F 21/602 |
| | | | 713/189 |
| 2016/0112190 A1 | 4/2016 | Aissi et al. | |
| 2016/0132692 A1 | 5/2016 | Kerschbaum et al. | |
| 2018/0039792 A1 | 2/2018 | Ohara et al. | |

(Continued)

*Primary Examiner* — Joshua Bullock
(74) *Attorney, Agent, or Firm* — Ference & Associates LLC (57) ABSTRACT

One embodiment provides a method, including: receiving, from a user, a dataset for encryption before its storage at a data storage location, wherein the dataset comprises a plurality of portions; identifying (i) attributes of the dataset and (ii) dataset dependencies; generating a recommendation for an encryption scheme to be used for the dataset, wherein the generating comprises (i) generating, based upon the attributes and the dataset dependencies, a recommendation of an encryption scheme for each portion of the dataset and (ii) identifying, based upon the dataset dependencies, a key label for each portion of the dataset, wherein the key label identified for a portion of the dataset that is dependent on another portion of the dataset is the same as the key label identified for said another portion of the dataset; and providing, to the user, (i) the generated recommendation and (ii) a description identifying reasons for the generated recommendation.

20 Claims, 3 Drawing Sheets

(56) References Cited

U.S. PATENT DOCUMENTS

| | | |
|---|---|---|
| 2018/0225475 A1 | 8/2018 | Watanabe |
| 2020/0226952 A1* | 7/2020 | Lightowler ............ H04L 9/0637 |
| 2020/0387518 A1* | 12/2020 | Kesarwani ............. G06F 21/602 |
| 2021/0092102 A1* | 3/2021 | Hathaway ............... H04L 67/02 |

* cited by examiner

FIG. 3

ENCRYPTION SCHEME RECOMMENDATION

BACKGROUND

Digital data are created and stored at many different enterprises. Storing and managing data require physical storage space to store the data. Additionally, the storage and management of the data require software to organize, access, and otherwise manage the data. Typically, it is the data owner, the enterprise that is capturing and/or storing the data, who is responsible for the storage and management of the data. However, the storage and management of the data can be very expensive. Additionally, the costs increase as the volume of data that needs to be stored and managed increases.

Thus, many data owners may outsource the storage and management of data to a third party, for example, a third-party database service provider, also referred to as a third-party storage provider or cloud service provider. An additional benefit of storing the data with the third party is that clients or users of the information can access the information or application through the third-party service provider, rather than having to access the originating source. Many of these third-party database service providers are cloud service providers that are accessible over an Internet connection. Such a model allows both client devices and the data owner to access the data in the third-party database service provider. This model eliminates the need for the data owner to purchase and manage expensive hardware and software to store and manage the data.

BRIEF SUMMARY

In summary, one aspect of the invention provides a method, comprising: receiving, from a user, a dataset for encryption before its storage at a data storage location, wherein the dataset comprises a plurality of portions; identifying, by parsing the dataset, (i) attributes of the dataset and (ii) dataset dependencies, wherein the dataset dependencies identify portions of the dataset that are dependent on other portions of the dataset; generating a recommendation for an encryption scheme to be used for the dataset, wherein the generating comprises (i) generating, based upon the attributes and the dataset dependencies, a recommendation of an encryption scheme for each portion of the dataset and (ii) identifying, based upon the dataset dependencies, a key label for each portion of the dataset, wherein the key label identified for a portion of the dataset that is dependent on another portion of the dataset is the same as the key label identified for said another portion of the dataset; and providing, to the user, (i) the generated recommendation and (ii) a description identifying reasons for the generated recommendation.

Another aspect of the invention provides an apparatus, comprising: at least one processor; and a computer readable storage medium having computer readable program code embodied therewith and executable by the at least one processor, the computer readable program code comprising: computer readable program code configured to receive, from a user, a dataset for encryption before its storage at a data storage location, wherein the dataset comprises a plurality of portions; computer readable program code configured to identify, by parsing the dataset, (i) attributes of the dataset and (ii) dataset dependencies, wherein the dataset dependencies identify portions of the dataset that are dependent on other portions of the dataset; computer readable program code configured to generate a recommendation for an encryption scheme to be used for the dataset, wherein the generating comprises (i) generating, based upon the attributes and the dataset dependencies, a recommendation of an encryption scheme for each portion of the dataset and (ii) identifying, based upon the dataset dependencies, a key label for each portion of the dataset, wherein the key label identified for a portion of the dataset that is dependent on another portion of the dataset is the same as the key label identified for said another portion of the dataset; and computer readable program code configured to provide, to the user, (i) the generated recommendation and (ii) a description identifying reasons for the generated recommendation.

An additional aspect of the invention provides a computer program product, comprising: a computer readable storage medium having computer readable program code embodied therewith, the computer readable program code executable by a processor and comprising: computer readable program code configured to receive, from a user, a dataset for encryption before its storage at a data storage location, wherein the dataset comprises a plurality of portions; computer readable program code configured to identify, by parsing the dataset, (i) attributes of the dataset and (ii) dataset dependencies, wherein the dataset dependencies identify portions of the dataset that are dependent on other portions of the dataset; computer readable program code configured to generate a recommendation for an encryption scheme to be used for the dataset, wherein the generating comprises (i) generating, based upon the attributes and the dataset dependencies, a recommendation of an encryption scheme for each portion of the dataset and (ii) identifying, based upon the dataset dependencies, a key label for each portion of the dataset, wherein the key label identified for a portion of the dataset that is dependent on another portion of the dataset is the same as the key label identified for said another portion of the dataset; and computer readable program code configured to provide, to the user, (i) the generated recommendation and (ii) a description identifying reasons for the generated recommendation.

A further aspect of the invention provides a method, comprising: receiving, from an entity and at a security advisor, a dataset for encryption by the security advisor before transmission to a data storage location, wherein the dataset comprises columns of data; identifying a plurality of encryption schemes available to the security advisor; determining, by analyzing the dataset, data dependencies identifying columns of the dataset dependent on other columns of the dataset; producing a recommendation for an encryption scheme from the plurality of encryption schemes to be employed on each of the columns of the dataset, wherein the producing a recommendation comprises (i) selecting, for each of the columns of the dataset, an encryption scheme fulfilling security requirements in view of preferences identified by the entity, (ii) creating, for each of the columns of the dataset, a label, the label being the same for dependent columns, and (iii) identifying reasons for the encryption scheme selection; and providing, to the entity, (i) the produced recommendation, (ii) a database schema generated by implementing the recommended encryption scheme on the dataset, and (iii) a description identifying reasons for the recommended encryption scheme.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, most if not all of the process steps, components and outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

Third-party database service providers are very useful and helpful to data owners. Rather than having to store and manage data, the data owner can simply transfer the data to the third-party. Since the third-party is generally accessible over the Internet, both the data owner and client devices can access the data. For example, if a data owner has an application hosted by the third-party storage provider, both the data owner and clients can access the application without having to access a site of the data owner. Therefore, the third-party database service provider provides an efficient, cost-effective, and scalable data storage and management solution to data owners. However, a problem with storing data at a third-party storage provider is that the data owner loses control over the data. Rather than maintaining the data on-site, the data owner is now shipping the data to a database service provider. In other words, the data owner cannot ensure that the data are secure. Therefore, many data owners choose to encrypt the data before transmission to and storage with the third-party storage provider.

However, there are many different encryption schemes each having a trade-off between efficiency and security. For example, while one encryption scheme may be very secure, that same encryption scheme may require large amounts of computational resources and responses may be slow compared to a less secure encryption scheme. Additionally, not all data within a dataset need to have the same encryption scheme or level of security. For example, one column or portion of data may be considered sensitive and may, therefore, need a more secure encryption scheme, even at the cost of efficiency, while another column or portion of data may not need to be encrypted at all. Determining what encryption scheme to use depends on many different factors, for example, sensitivity of the data, computational requirements, query workloads, and the like. Therefore, determining what encryption scheme to use for even a portion of the data takes a significant amount of time and resources. Thus, the data owner generally must employ an expert to determine what encryption scheme should be used to encrypt the data, thereby increasing the cost and time associated with encrypting the data before transmission to and storage with a third-party storage provider.

Accordingly, an embodiment provides a system and method for recommending an encryption scheme for a dataset based upon attributes and data dependencies of the dataset before the dataset is sent to a third-party service provider. The system receives, for example, at a security advisor, a dataset for encryption before transmission to and storage with a third-party storage provider. This dataset may include multiple portions of data. For example, the dataset may be in the form of a database schema and may include different columns and rows of data. With the dataset the system may receive additional user inputs, for example, user preferences, data statistics, query load requirements, and the like. The data statistics may provide information regarding any statistics associated with the data. The system may also receive global inputs, for example, inputs identifying features or attributes supported by the third-party storage provider, identification of encryption schemes available to the security advisor, default security requirements, query workload requirements, and the like.

The system parses the received information to identify different attributes and dependencies of the dataset. For example, the system may determine which portions of the dataset are sensitive, which portions are dependent upon other portions, the types or formats of data included in the dataset, and the like. In the case that additional user input was received, the system may also parse this information to identify different constraints that should be taken into account when recommending an encryption scheme. The system can then generate a recommendation for an encryption scheme to be used for the dataset. This recommended encryption scheme may include a recommendation for an encryption scheme to be used across different portions of the dataset. In other words, not every portion of the dataset has to be encrypted using the same encryption scheme. The recommendation also includes a recommendation of the key labels, or encryption keys, to be used for different portions of the dataset. Since some portions may be dependent on other portions, the system recommends the same key label for these dependent portions. Once the recommendation has been generated, the recommendation is provided to the user along with reasons why the encryption scheme was selected or recommended.

Such a system provides a technical improvement over current systems for data encryption by providing a system that is able to recommend an encryption scheme without the need for manual expert analysis. Not only is the system able to recommend an encryption scheme for the data, but the system is also able to recommend encryption schemes for different portions of the data based upon attributes of the data. For example, if one column of the data contains sensitive information, the system can recommend a more secure encryption scheme for that column of data as opposed to another less sensitive column of data. Additionally, the system is able to provide a recommendation for the key labels to be used with different portions of data, where recommended keys are the same for dependent portions of data. Additionally, since the system is able to identify which encryption schemes should be used for particular portions of data, the system is also able to identify expected storage needs and performance penalties for utilization of the encryption schemes, thereby providing a data owner with an estimate of the storage costs and performance requirements for employing the recommended encryption scheme. Additionally, since the system is also able to provide reasons why a particular encryption scheme was chosen or recommended, the data owner is able to change preferences in order to optimize the encryption scheme. Thus, the described system and method provide a more efficient and less-costly encryption scheme analysis than conventional manual analysis techniques. Additionally, the described system and method provide data owners with more flexibility and information with regard to selection of an encryption scheme than provided by conventional manual techniques.

Figure 1:
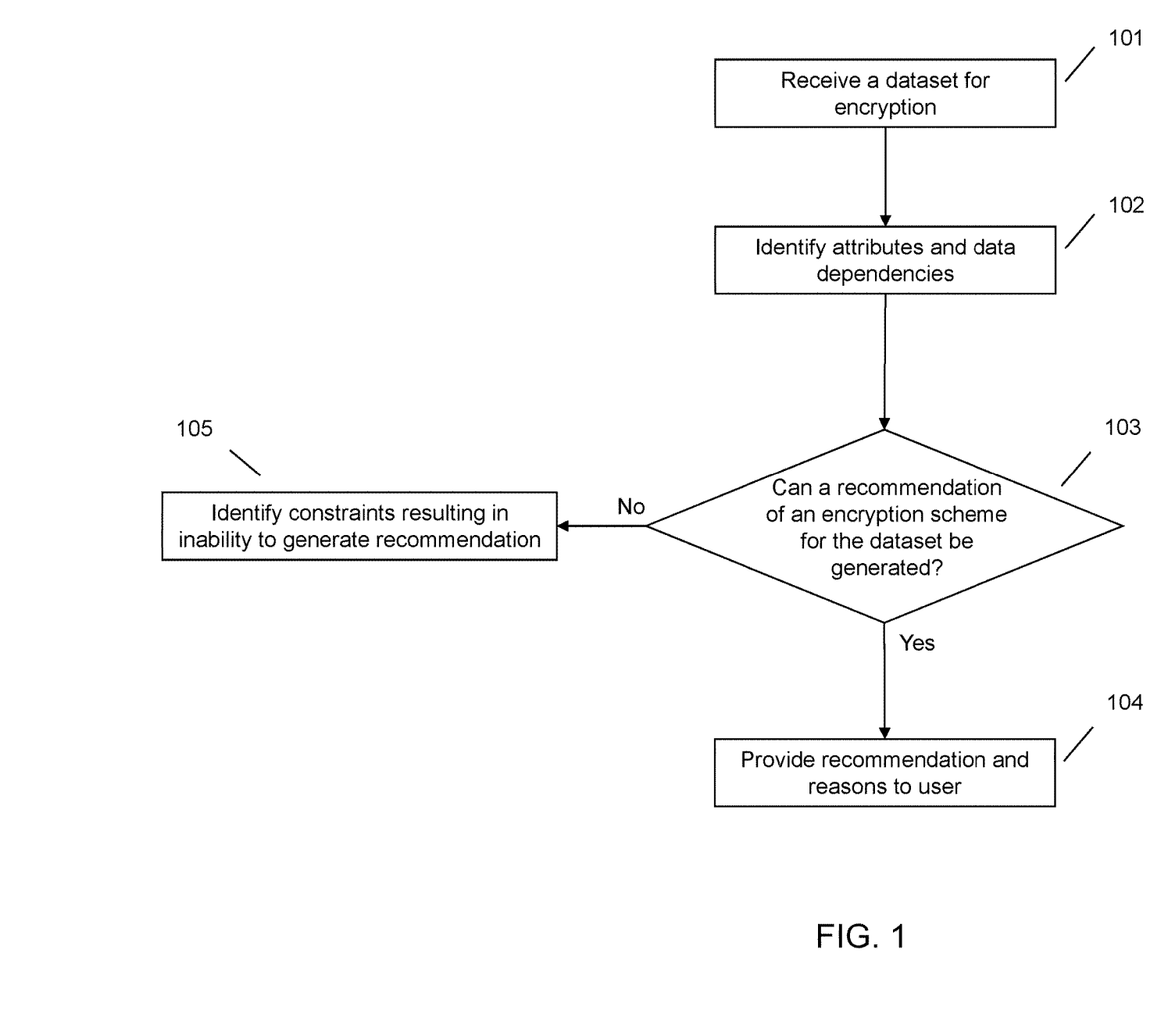
FIG. 1 illustrates a method of recommending an encryption scheme for a dataset based upon attributes and data dependencies of the dataset before the dataset is sent to a third-party service provider.

FIG. 1 illustrates a method for recommending an encryption scheme for a dataset based upon attributes and data dependencies of the dataset before the dataset is sent to a third-party service provider. At 101 the system receives, from a user (e.g., data owner, entity, system, user, etc.), a dataset that the user wants to encrypt before transmission to and storage at a third-party storage provider, for example, a cloud-service provider who will host the data. Receipt of the dataset may include a user uploading the dataset to an encryption scheme recommendation system, also referred to as a security advisor, providing a link or other location identifier to the system, accessing the system and directing the system to the location of the dataset, or the like. Alternatively, the system may intercept or otherwise obtain the dataset upon identifying a trigger action indicating that the dataset is ready for transmission to and storage with a third-party storage provider. For example, a user may store datasets that are ready to be transmitted to third-party storage providers in a particular location and the system may obtain all datasets that are stored in that system before transmission to the third-party storage provider.

The dataset may include a plurality of different portions, for example, columns of data, tabs of data, and the like. For example, the dataset may be provided as a database schema where the data are organized in columns and rows. In this example, each column and/or row would be a different portion of data. Each of the different portions of data may have different security requirements or needs. For example, one portion of the dataset may be considered sensitive and, therefore, require a higher security encryption scheme than another portion of the dataset which is considered less sensitive. Additionally, each portion of the dataset may have different storage or performance requirements. For example, one portion of the dataset may have higher performance requirements to allow for quicker query responses than another portion of the dataset.

In the case that the dataset is included in a database schema, the user provides the data definition file associated with the database schema. In the case that the dataset is included in a different format, the user provides the corresponding dataset file. The user may also provide a query workload. The query workload may identify what queries need to be or are supported by the dataset. In other words, the query workload may identify what queries are likely to be received from clients and, therefore, what queries need to be supported by an encryption scheme used to encrypt the dataset. The query workload identification may identify different query workloads for different portions of the dataset. For example, one portion of the dataset may receive a certain type of query, whereas a different portion of the dataset may receive a different type of query. As an example, the query workload may be provided in the form of a structured query language (SQL) file. Each query may be provided as its own file, may be provided as a single file with separators between queries, or a combination thereof.

Optionally, the user can also provide user preferences that identify different requirements or constraints for the dataset and/or encryption scheme. In other words, the user can provide an identification of requirements or constraints that need to be supported by the dataset and, therefore, the encryption scheme. For example, the user may identify a threshold for query support that identifies a minimum percentage of queries that need to be supported by a chosen encryption scheme. For example, the user may identify that the encryption scheme needs to support 90% of the queries that are received at the dataset. The user may also identify a weighting of queries that identifies weights for types of queries that may be received at the dataset. The weighting of queries may include an identification of query types and how important it is for the encryption scheme to support that query type. For example, a user may expect that a certain type of query is always supported by the encryption scheme and may, therefore, weight this type of query the highest. Therefore, when the encryption scheme is identified, the system can ensure that this type of query will be supported by the encryption scheme.

In addition to identifying parameters associated with queries, the user may also identify parameters associated with the storage and performance requirements of the encryption scheme. Generally, the more secure an encryption scheme, the more storage and computational resources are required by the encryption scheme. Therefore, the user may identify storage constraints that indicate a maximum storage expansion requirement that the encryption scheme can require. In other words, the user may identify how much storage space the user is willing to utilize and pay for in order to support the encryption scheme. Similarly, the user may provide preferences that identify computational constraints that identify a maximum computational slowdown in throughput. In other words, since more secure encryption schemes tend to require more computational resources and, therefore, slow response times, the user may identify how much of a computational slowdown the user is willing to sacrifice for encryption security.

Additionally, the user may have preferences with regard to the type of encryption scheme that is utilized. For example, the user may have a preference for a random encryption scheme over a deterministic encryption scheme. Accordingly, the user may provide input indicating an encryption scheme weighting that identifies the preference of the user for one encryption scheme over another. Therefore, in the case that the system identifies two or more encryption schemes that could be used to fulfill the rest of the requirements, the system may then choose the encryption scheme having the higher weighting as identified by the user. The user may also provide an indication of the sensitivity of different portions of the dataset. More sensitive data may be treated with a higher security level, and, therefore, an encryption having higher security, than less sensitive data. Therefore, the user can provide an indication of what portions of data that the user considers sensitive.

It should be understood that the user preferences may be directed to a single portion of the dataset or may apply to all of the dataset. For example, the user may identify preferences for a single dataset portion, may identify preferences that apply to all of the dataset, or some combination thereof. Additionally, not all user preferences have to apply to the dataset in the same manner. For example, the user may identify a user preference for storage constraints for one portion of the dataset and may also identify a user preference for a computational requirement for the entire dataset. As another example, the user may identify a minimum data sensitivity for the entire dataset and may additionally identify a particular data sensitivity for a particular portion of the dataset. In other words, the user does not have to provide user preferences evenly across the entire dataset or across the provided user preferences.

In addition to the user provided inputs, the system may also access global inputs. The global inputs may identify different attributes or features of encryption schemes supported by, or accessible to, the system or supported by the third-party storage provider. For example, if the third-party storage provider cannot support a particular encryption scheme, then the system would not want to recommend that type of encryption scheme. Accordingly, the global inputs may identify what encryption schemes can be used on the dataset. The global inputs may also identify the default security that is implemented by the system or the third-party storage provider. For example, the third-party storage provider may require that all datasets have a minimum security value. Therefore, the system will not apply any encryption schemes that will fall under that minimum security value. The global inputs may also include an identification of the query workload. As with the query workload identified by the user, the global input query workload may identify what queries need to be supported or are supported by the third-party storage provider.

At 102 the system may identify different attributes and features of the dataset and dataset dependencies. This identification may occur by parsing the information received at 101. For example, the system may read and parse the dataset file to identify different attributes of the dataset, for example, dataset portions, data formats or types, dataset portion locations, and the like. As another example, the system may parse the SQL queries from the query file to identify the types of expected queries, the format of expected queries, and the like. The system may also parse the user preferences and/or global inputs in order to identify the preferences and which portions of the dataset the preferences are applicable to. In addition to identifying attributes and features of the dataset and/or preferences, the system may also identify data dependencies. This may include identifying different portions of the dataset that are dependent upon another portion. For example, one column of the dataset may be dependent on another column of the dataset. This allows the system to determine if any of the dataset portions have foreign key dependencies.

At 103 the system may determine whether a recommendation of an encryption scheme for the dataset can be generated. To generate a recommendation the system may generate a recommendation of an encryption scheme for each portion of the dataset. In other words, the system encryption scheme that is recommended does not need to be the same across the entirety of the dataset. Rather, each portion of the dataset may employ a different encryption scheme. The system is able to generate a recommendation of an encryption scheme for each of these portions independent from the encryption scheme recommendation for other portions of the dataset. However, the system also takes into account dataset portion dependencies or dataset relatedness. Therefore, if one dataset portion is dependent on another dataset portion or is related to another dataset portion, the encryption scheme recommended for the first dataset portion may influence the encryption scheme recommended for the dependent dataset portion based upon the dependency type. For example, if dataset portions are dependent and one portion of the dependent dataset pair has a higher data sensitivity than the other portion of the dependent dataset pair, the system may recommend an encryption scheme for each of the dependent dataset pairs that is based upon the higher data sensitivity in order to maintain that data sensitivity across both of the dataset portions in the dependent pair.

In generating an encryption recommendation for each portion of the dataset, the system may also highlight any discrepancies between user preferences or between the recommended encryption scheme and the user preferences. For example, if the user provides an indication of a data sensitivity of a column that would require a highly secure encryption scheme, but then also identifies a storage requirement constraint that would not support the highly secure encryption scheme, the system may highlight this discrepancy. As another example, if the user provides a preference that is not fulfilled by the recommended encryption scheme, the system may highlight this discrepancy. In recommending an encryption scheme, the system attempts to satisfy all of the user preferences while still satisfying the requirements. In other words, the system attempts to optimize the encryption scheme with respect to security, query coverage, storage budget, computation constraints, and user preferences.

In generating a recommendation, the system also suggests key labels for each portion of the dataset. The key labels or labels provide a suggestion as to a specific encryption key that should be used for each portion of the dataset. In recommending key labels, the system takes into account any dataset dependencies. For the dataset portions that are dependent on other portions, the system recommends the same key label. In other words, if one dataset portion is dependent on another dataset portion, the key that should be used for both of these dataset portions should be the same so that both can be accessed in a similar manner.

The recommendation may also include other information. For example, the recommendation may include identifying a storage expansion requirement for each portion of the dataset. This storage expansion requirement is based upon the recommended encryption scheme. In other words, each encryption scheme has an associated storage expansion requirement, and, therefore, when an encryption scheme is recommended, the system can also provide an indication to the user regarding how much storage expansion space will be required for that encryption scheme. This allows the user to determine how much storage space will be necessary for storing the dataset.

The recommendation may also include reasons for suggestion of an encryption scheme and recommendations regarding the encryption scheme. This may be referred to as provenance information and improvements. Since the system knows what information was used to identify an encryption scheme and how the system weighted each of the inputs, the system can generate a detailed description providing this information to the user. For example, if the system determined that the security of a portion of the dataset outweighed the storage space constraint preference of the user, the system can provide a description stating this. Additionally, the system can identify or highlight any performance penalties that are associated with the use of a particular encryption scheme. Using the description information, the user can determine if the recommended encryption scheme is actually the encryption scheme that the user wants to implement. Additionally, since the system can identify why certain selections were made, the system can also identify what constraints or user preferences could be changed in order to improve the encryption scheme recommendation. Therefore, the system can provide recommendations identifying the same. Accordingly, the system can optimize the encryption scheme.

If a recommendation for an encryption scheme cannot be generated at 103, the system may identify the constraints that are resulting in the inability to generate the recommendation at 105. The system may then provide this output to the user to receive feedback regarding the steps that the system should take to rectify the inability to generate the encryption scheme. Alternatively, the system may generate a recommendation of the encryption scheme for as many portions of the dataset as the system can, provide this recommendation to the user, and also provide an indication of dataset portions that are not included in the recommendation.

If, however, a recommendation for an encryption scheme can be generated at 103, the system may provide a recommendation of the encryption scheme to the user at 104. In addition to the recommendation, the system may provide the description identifying the reasons for the recommended encryption scheme, or provenance, and recommendation information to the user. Upon receiving the recommendation, the user may provide feedback regarding the recommended encryption scheme. For example, the user may provide feedback identifying user preferences or requirements that can be relaxed or need a higher weighting, identifying an encryption scheme for a portion of the dataset that the user wants changed, or the like. Upon receipt of this feedback, the system may update the recommended encryption scheme to fulfill the new requirements or user feedback.

Once the user approves or accepts a recommended encryption scheme, the system may generate a database schema the implements the recommended encryption scheme. In other words, once the user approves the recommended encryption scheme, the system may encrypt the dataset using the recommended encryption scheme. The newly encrypted dataset or database schema may then be transmitted to the third-party storage provider for storage.

Figure 2:
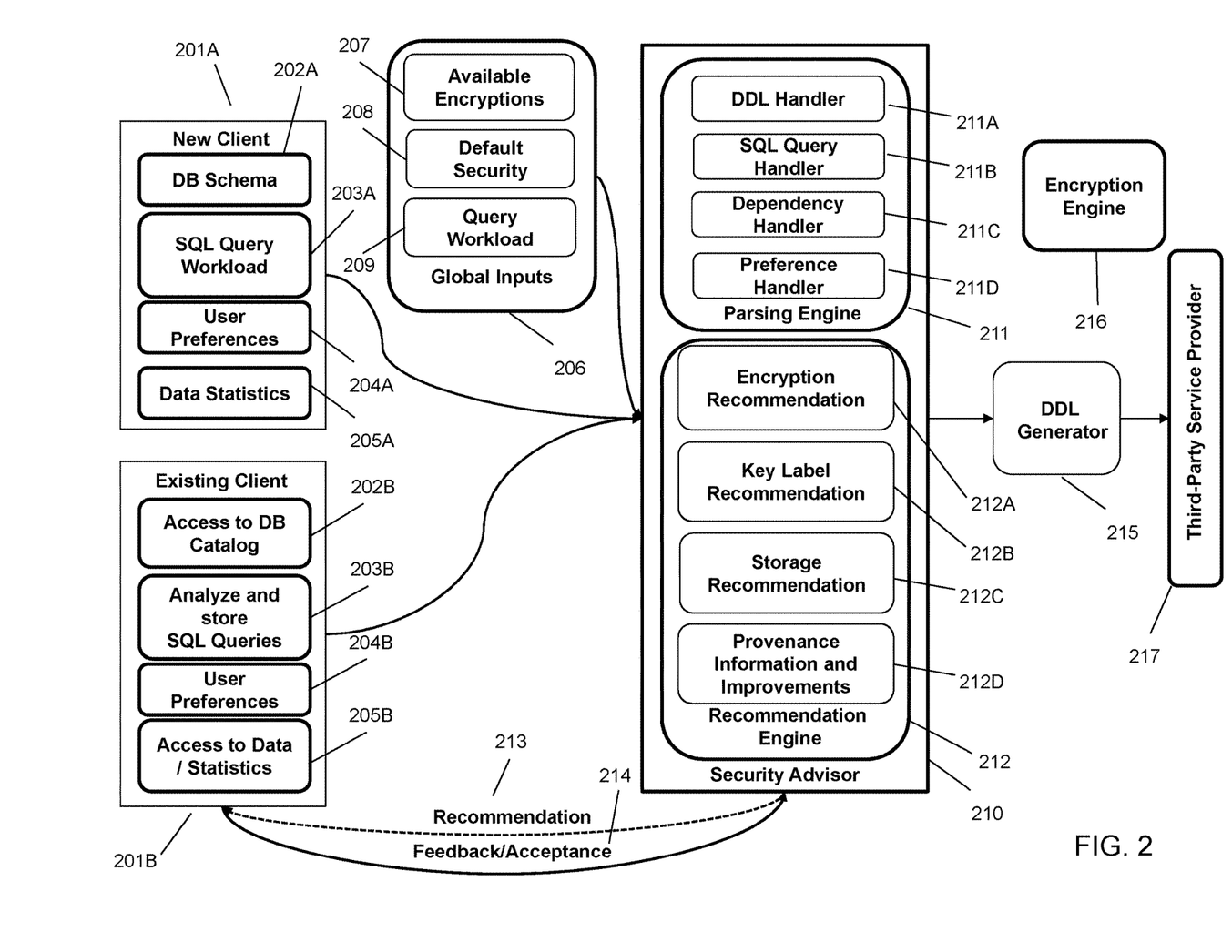
FIG. 2 illustrates an example system architecture for recommending an encryption scheme for a dataset based upon attributes and data dependencies of the dataset before the dataset is sent to a third-party service provider.

FIG. 2 illustrates an overall system architecture for generating encryption scheme recommendations. The system receives inputs from clients 201A and 201B. Client 201A is a new client, so the inputs, database schema 202A, SQL query workload 203A, user preferences 204A, and data statistics 205A, are uploaded to the system, for example, the security advisor 210. Client 201B is an existing client, so the system 210, is able to access the inputs, database schema/catalog 202B, SQL queries 203B, user preferences 204B, and data statistics 205B, at a storage location known to the security advisor 210. The security advisor also receives the global inputs 206 including available encryptions 207, default security 208, and query workload 209.

The security advisor 210 employs a parsing engine 211 to parse the received inputs. For example, the parsing engine 210 may include a DDL handler 211A to parse the dataset and/or file associated with the dataset, a SQL query handler 211B to parse the query workload, a dependency 211C to identify dataset portion dependencies, and a preference handler 211D to parse the user preferences. Once the information is parsed, the security advisor 210 employs a recommendation engine 212 to generate a recommended encryption scheme for each portion of the dataset. The recommendation engine 212 includes an encryption recommendation module 212A that generates the recommendation, a key label recommendation module 212B that suggests key labels for each portion of the dataset, a storage recommendation module 212C that identifies and suggests storage requirements necessary for implementing the recommended encryption scheme, and a provenance information and improvements module 212D that provides a description detailing the reasons why an encryption scheme was recommended and recommendations for ways that the recommended encryption scheme could be better optimized.

This recommendation is provided to the corresponding client 213. Upon receiving feedback 214 from the user, the system may update the recommended encryption scheme. Alternatively, or after the system provides an updated recommendation, the user may accept the recommended encryption scheme 214. Once the encryption scheme is accepted by the user, the system employs a DDL generator 215 to generate a database schema for encrypted database. Then, the encryption engine 216 encrypts the database implementing the recommended encryption scheme on the dataset. In other words, the encryption engine 216 generates an encrypted dataset from the original dataset and the recommended encryption scheme. This encrypted dataset is then sent to the third-party service provider 217 for storage.

Such a system and method provide a technical improvement over current techniques for encryption scheme selection and analysis. The described system and method provide a technique for recommending an encryption scheme for a dataset. Not only can the described system and method provide a recommendation for an encryption scheme for an entire dataset, but the system and method can also provide a recommendation for an encryption scheme to be used for different portions of the data, thereby optimizing security requirements against efficiency of the employed encryption scheme. Additionally, since the system is able to identify and provide reasons for why a particular encryption scheme was recommended, the data owner has an opportunity to change preferences or requirements before the dataset is encrypted in order to optimize cost and performance against security needs. Using conventional manual encryption scheme analysis techniques, changing the preferences or requirements would require large amounts of costly rework and reanalysis to determine if a cost or performance savings could be achieved, thereby minimizing or eliminating any possible cost savings to the data owner. Thus, the described system and method provide a more efficient and flexible encryption scheme analysis technique than the conventional manual analysis techniques. Additionally, since the system and method provide a technique for quickly analyzing encryption scheme security against performance and storage costs, the described system provides a technique for optimizing the encryption scheme selection that is not possible using conventional manual analysis techniques.

Figure 3:
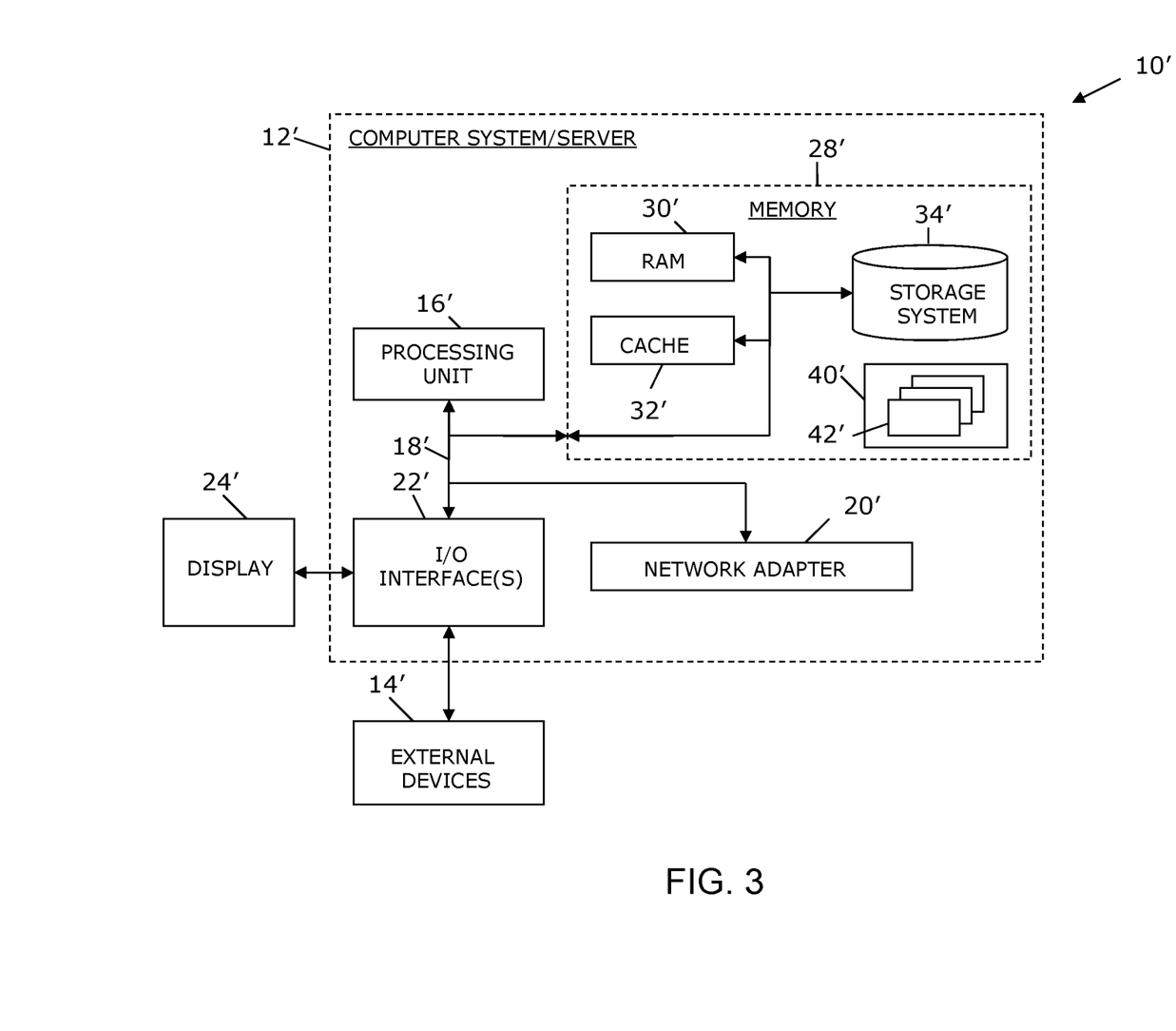
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
   receiving, from a user, a dataset for encryption before its storage at a data storage location, wherein the dataset comprises a plurality of portions;
   identifying, by parsing the dataset, (i) attributes of the dataset and (ii) dataset dependencies, wherein the dataset dependencies identify portions of the dataset that are dependent on other portions of the dataset;
   generating a recommendation for an encryption scheme to be used for the dataset, wherein the generating comprises (i) generating, based upon the attributes and the dataset dependencies, a recommendation of an encryption scheme for each portion of the dataset and (ii) identifying, based upon the dataset dependencies, a key label for each portion of the dataset, wherein the key label identified for a portion of the dataset that is dependent on another portion of the dataset is the same as the key label identified for said another portion of the dataset; and
   providing, to the user, (i) the generated recommendation and (ii) a description identifying reasons for the generated recommendation.

2. The method of claim 1, wherein the receiving a dataset comprises receiving (i) a database schema describing the dataset and (ii) a structured query language query workload identifying queries supported by the dataset.

3. The method of claim 1, wherein the receiving a dataset comprises receiving user preferences identifying requirements to be supported by an encryption scheme with respect to the dataset.

4. The method of claim 3, wherein the user preferences comprise at least one of (i) a threshold for query support identifying a minimum percentage of queries to be supported by an encryption scheme, (ii) weighted queries identifying a weighting of queries to be supported by an encryption scheme, (iii) storage constraints indicating a maximum storage expansion requirement of an encryption scheme, (iv) computational constraints indicating a maximum computational slowdown caused by an encryption scheme, (v) encryption scheme weighting identifying a user preference for one encryption scheme over another encryption scheme, and (vi) a security sensitivity associated with each portion of the dataset.

5. The method of claim 3, wherein the generating a recommendation comprises identifying discrepancies between the user preferences and the generated recommendation.

6. The method of claim 1, wherein the generating a recommendation comprises identifying a storage expansion requirement for each portion of the dataset required by the recommended encryption scheme corresponding to the portion.

7. The method of claim 1, wherein the generating a recommendation of an encryption scheme for each portion of the dataset comprises recommending the same encryption scheme for dataset portions identified as related.

8. The method of claim 1, comprising generating a database schema implementing the recommended encryption scheme on the dataset.

9. The method of claim 1, wherein the description identifies expected performance penalties of the recommended encryption scheme.

10. The method of claim 1, comprising receiving, from the user, feedback regarding the recommended encryption scheme; and
updating the recommended encryption scheme based upon the feedback.

11. An apparatus, comprising:
at least one processor; and
a computer readable storage medium having computer readable program code embodied therewith and executable by the at least one processor, the computer readable program code comprising:
computer readable program code configured to receive, from a user, a dataset for encryption before its storage at a data storage location, wherein the dataset comprises a plurality of portions;
computer readable program code configured to identify, by parsing the dataset, (i) attributes of the dataset and (ii) dataset dependencies, wherein the dataset dependencies identify portions of the dataset that are dependent on other portions of the dataset;
computer readable program code configured to generate a recommendation for an encryption scheme to be used for the dataset, wherein the generating comprises (i) generating, based upon the attributes and the dataset dependencies, a recommendation of an encryption scheme for each portion of the dataset and (ii) identifying, based upon the dataset dependencies, a key label for each portion of the dataset, wherein the key label identified for a portion of the dataset that is dependent on another portion of the dataset is the same as the key label identified for said another portion of the dataset; and
computer readable program code configured to provide, to the user, (i) the generated recommendation and (ii) a description identifying reasons for the generated recommendation.

12. A computer program product, comprising:
a computer readable storage medium having computer readable program code embodied therewith, the computer readable program code executable by a processor and comprising:
computer readable program code configured to receive, from a user, a dataset for encryption before its storage at a data storage location, wherein the dataset comprises a plurality of portions;
computer readable program code configured to identify, by parsing the dataset, (i) attributes of the dataset and (ii) dataset dependencies, wherein the dataset dependencies identify portions of the dataset that are dependent on other portions of the dataset;
computer readable program code configured to generate a recommendation for an encryption scheme to be used for the dataset, wherein the generating comprises (i) generating, based upon the attributes and the dataset dependencies, a recommendation of an encryption scheme for each portion of the dataset and (ii) identifying, based upon the dataset dependencies, a key label for each portion of the dataset, wherein the key label identified for a portion of the dataset that is dependent on another portion of the dataset is the same as the key label identified for said another portion of the dataset; and
computer readable program code configured to provide, to the user, (i) the generated recommendation and (ii) a description identifying reasons for the generated recommendation.

13. The computer program product of claim 12, wherein the receiving a dataset comprises receiving (i) a database schema describing the dataset and (ii) a structured query language query workload identifying queries supported by the dataset.

14. The computer program product of claim 12, wherein the receiving a dataset comprises receiving user preferences identifying requirements to be supported by an encryption scheme with respect to the dataset.

15. The computer program product of claim 14, wherein the user preferences comprise at least one of (i) a threshold for query support identifying a minimum percentage of queries to be supported by an encryption scheme, (ii) weighted queries identifying a weighting of queries to be supported by an encryption scheme, (iii) storage constraints indicating a maximum storage expansion requirement of an encryption scheme, (iv) computational constraints indicating a maximum computational slowdown caused by an encryption scheme, (v) encryption scheme weighting identifying a user preference for one encryption scheme over another encryption scheme, and (vi) a security sensitivity associated with each portion of the dataset.

16. The computer program product of claim 14, wherein the generating a recommendation comprises identifying discrepancies between the user preferences and the recommendation.

17. The computer program product of claim 12, wherein the generating a recommendation comprises identifying a storage expansion requirement for each portion of the dataset required by the recommended encryption scheme corresponding to the portion.

18. The computer program product of claim 12, wherein the generating a recommendation of an encryption scheme for each portion of the dataset comprises recommending the same encryption scheme for dataset portions identified as related.

19. The computer program product of claim 12, comprising generating a database schema implementing the recommended encryption scheme on the dataset.

20. A method, comprising:
receiving, from an entity and at a security advisor, a dataset for encryption by the security advisor before transmission to a data storage location, wherein the dataset comprises columns of data;
identifying a plurality of encryption schemes available to the security advisor;
determining, by analyzing the dataset, data dependencies identifying columns of the dataset dependent on other columns of the dataset;
producing a recommendation for an encryption scheme from the plurality of encryption schemes to be employed on each of the columns of the dataset, wherein the producing a recommendation comprises (i) selecting, for each of the columns of the dataset, an encryption scheme fulfilling security requirements in view of preferences identified by the entity, (ii) creating, for each of the columns of the dataset, a label, the label being the same for dependent columns, and (iii) identifying reasons for the encryption scheme selection; and
providing, to the entity, (i) the produced recommendation and (ii) a database schema generated by implementing the recommended encryption scheme on the dataset.

* * * * *